US007118681B2

(12) United States Patent
Pirot

(10) Patent No.: US 7,118,681 B2
(45) Date of Patent: Oct. 10, 2006

(54) METHOD FOR THE FABRICATION OF AN OPTICAL DISK MASTER

(76) Inventor: Francois-Xavier Pirot, 13 rue Odolant Desnos, F-61000, Alencon (FR)

( * ) Notice: Subject to any disclaimer, the term of this patent is extended or adjusted under 35 U.S.C. 154(b) by 260 days.

(21) Appl. No.: 10/746,354

(22) Filed: Dec. 24, 2003

(65) Prior Publication Data

US 2004/0149678 A1 Aug. 5, 2004

Related U.S. Application Data

(63) Continuation of application No. PCT/FR02/02084, filed on Jun. 17, 2002.

(51) Int. Cl.
*B29D 11/00* (2006.01)
*G11B 7/00* (2006.01)

(52) U.S. Cl. .............................. 216/24; 216/11; 216/58; 216/88; 430/321; 369/275.1; 428/64.4; 264/1.33; 264/2.5

(58) Field of Classification Search .................. 216/11, 216/24, 58, 88; 264/1.33, 2.5; 430/321; 428/64.4; 369/275.1
See application file for complete search history.

(56) References Cited

U.S. PATENT DOCUMENTS 5,622,815 A * 4/1997 Ledieu ...................... 430/320

6,288,998 B1 * 9/2001 Taira ........................ 369/275.4
6,352,656 B1 * 3/2002 Kimura et al. ............... 264/2.5

FOREIGN PATENT DOCUMENTS

DE 198 30 293 A1 1/1999
WO WO 99/18572 4/1999

* cited by examiner

*Primary Examiner*—Shamim Ahmed
(74) *Attorney, Agent, or Firm*—DLA Piper

(57) ABSTRACT

A method for fabricating an optical disk master including fabricating a precursor formed from a substrate including at least one layer of metallic material and having at least one protuberance or indentation guiding track; preparing the precursor by superposing on the substrate at least one layer of a first material and a second material different from the first material; eroding at least a portion of a surface of one of the materials to only allow to subsist one of the materials at a site of the guiding tracks; depositing on the surface a reactive resin; personalizing the precursor by structuring the reactive surface as a function of information specific to the master to locally eliminate the reactive resin; performing etching zones of the second material at a site of unmasked guiding tracks; and eliminating subsisting deposits of resin and the first material outside of the zones where it is covered by the second material.

23 Claims, 2 Drawing Sheets

METHOD FOR THE FABRICATION OF AN OPTICAL DISK MASTER

RELATED APPLICATION

This is a continuation of International Application No. PCT/FR02/02084, with an international filing date of Jun. 17, 2002 (WO 03/001521, published Jan. 3, 2003), which is based on French Patent Application No. 01/08423, filed Jun. 26, 2001.

FIELD OF THE INVENTION

This invention pertains to the field of optical disks, more precisely to the field of the fabrication of masters for pressing optical disks.

BACKGROUND

The fabrication of masters, usually called "mastering", consists of integrating on an intermediary support personalization information intended for industrial pressing optical disks. The quality of the master determines the quality of the final product. This operation is performed in the state of the art by long, painstaking solutions, employing complex equipment, the employment of which is often centralized with specialized suppliers who perform for multiple industrial corporations the pressing of personalized masters. These masters are then used for pressing polycarbonate disks. They are in the form of nickel wafers bearing the information to be reproduced in the form of microreliefs forming by molding disks of approximately 150 nanometers in thickness and 0.4×0.3 µm for DVDs and 0.8×1 µm for CDs.

WO 99/18572, for example, describes a method for the fabrication of a pressing master for production of optical disks. This method consists of applying a photoresist on the plate of a pressing master, then of structuring the photoresist film applied in this manner. This structuring step consists successively of sublimating locally and heating the photoresist film prior to subjecting it to a supplementary exposure step in the range of ultraviolet to short wavelength, prior to its final thermal treatment. The effective dose of this supplementary exposure step ranges between $4 \cdot 10^{-4}$ and $5 \cdot 10^{-2}$ J/cm$^2$.

Also known are solutions for disk etching on a unit basis. WO 00/08643 describes, for example, a pre-etched substrate for a memory disk that can be recorded by a magnetic, magneto-optical or optical phase transition stress. This pre-etched substrate comprises a support having at its surface a surface layer made of a reflective material and making it possible to obtain an optically polished surface and at least one recordable surface. These layers comprise a succession of micropits and/or grooves representing a preforming signal.

It would therefore be advantageous to provide a method for the fabrication of masters compatible with use for industrial pressing by polycarbonate molding and not merely by a unit basis etching, while simplifying the fabrication of the masters and avoiding the recourse to an initial support made of glass and multiplication of the steps that results therefrom.

SUMMARY OF THE INVENTION

This invention relates to a method of fabricating an optical disk master including fabricating a precursor formed from a substrate including at least one layer of metallic material and having at least one protuberance guiding track or indentation guiding track; preparing the precursor by superposing on the substrate at least one layer of a first material and a second material different from the first material; eroding at least a portion of a surface of one of the materials to only allow to subsist one of the materials at a site of the guiding track; depositing on the surface a reactive resin; personalizing the precursor by structuring the reactive surface as a function of information specific to the master to locally eliminate the reactive resin; establishing etching zones of the second material at a site of unmasked guiding tracks; and eliminating subsisting deposits of resin and the first material outside of the zones covered by the second material.

This invention also relates to a precursor for fabricating an optical disk including a preformatted metallic substrate having guiding tracks formed from at least one protuberant rib, a dielectric coating layer, a thickest part of which has a thickness included between the height of the guiding tracks and the height augmented by the thickness of the layer, with a margin equal to or less than at most or at least about 20% of a reference thickness, the coating capable of receiving a reactive resin.

This invention further relates to a precursor for fabricating an optical disk including a preformatted metallic substrate having guiding tracks formed from at least one spiral groove, a first layer, optionally, a separation layer, a second layer having optical properties essentially different from the subjacent layers at a wavelength for structuring reactive resin, the thickness of a thickest part of the second layer being essentially included between the height of the groove and the height augmented by the thickness of the separation layer, with a margin equal to or less than at most or at least about 20% of a reference thickness, the coating capable of receiving a reactive resin.

BRIEF DESCRIPTION OF THE DRAWINGS

Better comprehension of the invention will be obtained from the description of a nonlimitative example of implementation with reference to the attached drawings in which.

DETAILED DESCRIPTION

Figure 1:
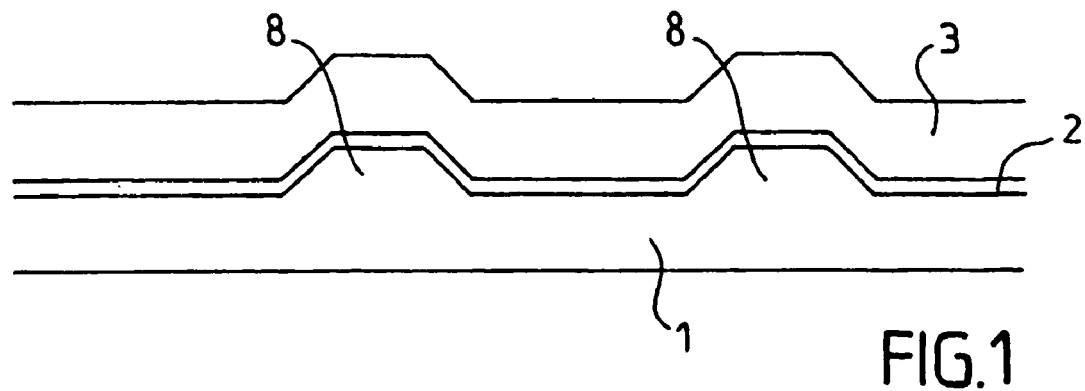
FIGS. 1 to 4 represents views in radial section of a precursor at different phases of preparation in accordance with aspects of the invention.

It will be appreciated that the following description is intended to refer to specific embodiments of the invention selected for illustration in the drawings and is not intended to define or limit the invention, other than in the appended claim.

The invention pertains in its broadest sense to a method for the fabrication of an optical disk master comprising fabricating a precursor constituted of a substrate made of a metallic material, advantageously a material suitable for etching, and having at least one protuberant or indented guiding track, preparing the precursor constituted of depositing on the substrate at least one layer of a first material, then optionally depositing a second material, in a manner such that the first material levels the surface of the precursor outside the guiding tracks, the material leveling the surface of the precursor on the guiding tracks being called "second material".

The surface of the master is eroded prior to the depositing of a resin to allow only one of the two materials above the guiding tracks to subsist. According to a first variant, the guiding tracks made of material are protuberant, metallic, this metal, which can be etched, leveling the surface of the precursor on the guiding track, and this metal is present on the substrate prior to the deposit of the material.

According to a second variant, the guiding tracks are grooves. They level on the surface of the precursor a second material referred to as "material 2" deposited subsequent to the first material.

The method of the invention includes depositing on the surface prepared in this manner a reactive resin, for example, a photosensitive resin or a colorant capable of being sublimated locally. The method then includes personalizing the precursor by structuring the reactive surface as a function of information specific to the master in a manner to locally eliminate the reactive resin, wherein the method comprises a development stage including proceeding to etching the zones of second variant material placed above the unmasked guiding tracks and then eliminating the subsisting deposit of resin and the first material outside of the zones in which the second variant material is found.

The first material is preferably constituted of at least one layer of material of optical properties essentially different from that of material 2 at a wavelength used in equipment permitting the structuring of the reactive resin.

According to a first variant, the guiding tracks are constituted by least one protuberant spiral. According to a second variant, the guiding tracks are constituted by at least one groove. The metallic material constituting the metallic material is advantageously selected from the group comprising nickel, nickel-based alloys, chromium, chromium-based alloys, titanium nitrides, tantalum, molybdenum and their alloys.

According to a particular implementation of the second variant, the second material deposited subsequent to the first material is constituted of at least one layer that can prevent local etching of the first material under the second material in the step of personalization of the precursor.

According to a first variant, the reactive resin is a photoreactive resin resistant to the etching products of the metallic material.

According to a second variant, the reactive resin is a photosensitive resin.

The step of preparation of the precursor preferably comprises a planarization step prior to depositing the reactive resin. The planarization step is advantageously implemented by mechanical-chemical polishing, by polishing on dry film, by the etch back process, consisting of depositing on the covered precursor of a dielectric material with a thickness of about 200 to about 500 nm of a layer of polymer resin having a plane surface, then etching the surface with a dry etching process lifting at an identical rate resin and dielectric material until total disappearance of the resin, by depositing a planarizing polymer layer, for example, constituted of photosensitive Novolak resin or polyimide material, undergoing a first gentle annealing, followed by a controlled etching of said polymer layer to uncover the leveling material 2 then an energetic annealing at a temperature higher than about 110° C.

According to an advantageous mode of implementation, the step of fabricating the precursors comprising the guiding tracks comprises an electroplating step. The step of fabrication of the precursors comprising the guiding tracks, advantageously comprises a step of molding the substrate.

The invention also pertains to a method for the fabrication of an optical disk pressing master comprising a step of fabrication of a precursor constituted of a metallic material bearing guiding elements of radial width predetermined during a first substrate fabrication step, these guiding elements being locally etched by masked development method by a structured reactive resin, characterized in that the first material (referred to as "material 1") is of a nature insensitive to the etching of the guiding element, the radial width at the end of the process of the individual information elements cleared from the guiding element being then determined by the initial radial width of the guiding elements, and the length in the tangential direction of the individual information elements is determined by the structuring process of the reactive resin.

According to a variant, the step of preparation of the precursor comprises an operation of depositing on the metallic substrate of a first separation layer having a thickness smaller than the guiding reliefs, and an exterior layer made of a dielectric material, and prior to depositing the reactive resin there is a planarization operation by abrasion to allow to subsist a thickness of coating comprised between the height of the guiding reliefs and the height augmented by the thickness of the separation layer.

The invention also pertains to a method for the fabrication of an optical disk pressing master comprising a step of fabrication of a substrate constituted of a metallic material bearing protuberant metallic guiding elements, these guiding elements being locally etched by a masked development process by a structured reactive resin, characterized in that the slope between the base and the apex of the information elements in the radial direction generated during a first substrate formation process, typically comprised between about 20 and about 60° in relation to the reference plane of the substrate, is unchanged during the processes of deposits and removals leading to an individualized master, whereas this slope of the information elements in the tangential direction, typically comprised between about 40 and about 90° in relation to the reference plane of the substrate, is generated by a masked procedure by a structured resin.

The metallic substrate is advantageously fabricated by superposing a first metallic layer on the substrate prior to depositing material 1, the metallic layer having the property of being able to be etched in a selective manner in relation to the substrate.

The step of preparation of the precursor advantageously comprises a first operation of depositing the first material, followed by an operation of depositing a separation layer having a thickness smaller that the guiding reliefs then an exterior layer made of dielectric material, and an operation of planarization by abrasion prior to depositing the reactive resin to allow to subsist a coating thickness comprised between the height of the guiding reliefs and the height augmented by the thickness of the separation layer.

According to a variant, the first material is etched during the master personalization step using the second material as a mask, characterized in that the original metallic substrate comprises guiding grooves the sides of which have a slope comprised between about 20 and about 60° in relation to the principal plane of the substrate, the second material having consequently a variable thickness in a radial direction, and in that the second material is slowly etched during the etching of the first material, leading to a slope of the first material in a radial direction comprised between about 20 and about 60° in relation to the plane of the substrate, and a slope between about 40 and about 90° in relation to the substrate in the direction tangential to the tracks.

The invention also pertains to a precursor constituted of a preformatted metallic substrate having guiding tracks which are constituted of at least one protuberant spiral, a dielectric layer, the coating thickness being comprised between the height of the guiding reliefs and the height augmented by the thickness of the separation layer, with a margin equal to or less than at most or least of 20% of the reference thickness, this coating being intended to receive a reactive resin.

The invention also pertains to a precursor constituted of a preformatted metallic substrate having guiding tracks which are constituted of at least one concave spiral, a first layer, optionally a separation later, a second layer having optical properties essentially different from that of the subjacent layers at a wavelength used in equipment enabling structuring of the reactive resin, the thickness of the second layer being essentially comprised between the height of the guiding reliefs and said height augmented by the thickness of the separation layer equal to or less than at most or least of about 20% of the reference thickness, wherein the coating is intended to receive a reactive resin.

The method described as a nonlimitative example comprises first preparing a nickel precursor having standard guiding tracks without personalization information. The guiding information is constituted of a groove in relief the characteristics (pitch, width, circularity) of which are optimized to ensure functioning of the final product with very high precision. The precursor can be prepared from a nickel foil 138 mm or more in diameter, corresponding to the diameter of the silicon wafers used in the semiconductor industry, for example 150 mm. The precursor can be prepared from a nickel foil 300 micrometers or more in thickness, corresponding to a thickness similar to that of the silicon wafers used in the semiconductor industry.

The foil can have dimensions (length, width) making it possible to prepare on the same support a multiplicity of precursors which are then cut out by stamping to form disk pressing wafers intended to be introduced into the pressing mold.

The fabrication of this precursor can be implemented by various techniques, notably reproduction by electroplating from a glass type master. Turning now to the drawings, the substrate (1) made of nickel or a similar material is prepared according to a reduced number of operations. The first series of operations represented in FIG. 1 comprises depositing two layers of dielectric materials (2, 3) on the substrate (1):

full phase deposition by reactive spraying or comparable process of a first thin layer of a dielectric (2) forming a separation layer. This material is, for example, a silicon nitride. The thickness of this separation layer (2) may be several nanometers. It forms a film of substantially uniform thickness following the form of the guiding ribs (8).

A second deposition (3) is formed on separation layer (2). This second deposition is a dielectric material, for example, silica, resisting the etching of the substrate during subsequent operations. It also forms a film of substantially uniform thickness covering notably the guiding track and, thus, following the relief of the separation layer.

Figure 2:
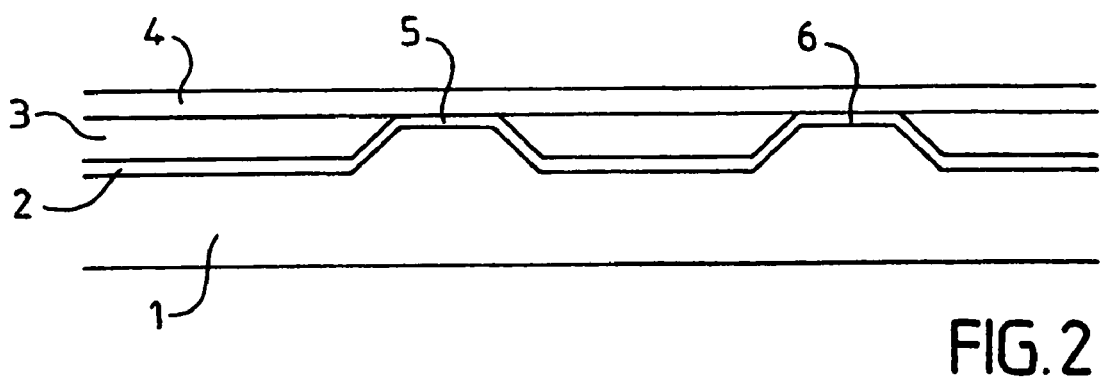

The next step represented in FIG. 2 comprises performing a mechanical-chemical polishing to level the apices (5, 6) of the spirals on which the separation layer (2) subsists. In contrast, the dielectric layer (3) disappears at the level of the spirals in relief and subsists in the spaces between the guiding ribs (8, 9).

After polishing, there is performed the coating of the surface on a plate coating machine with a very thin photosensitive resin (4) of a thickness of about ten nanometers.

Figure 3:
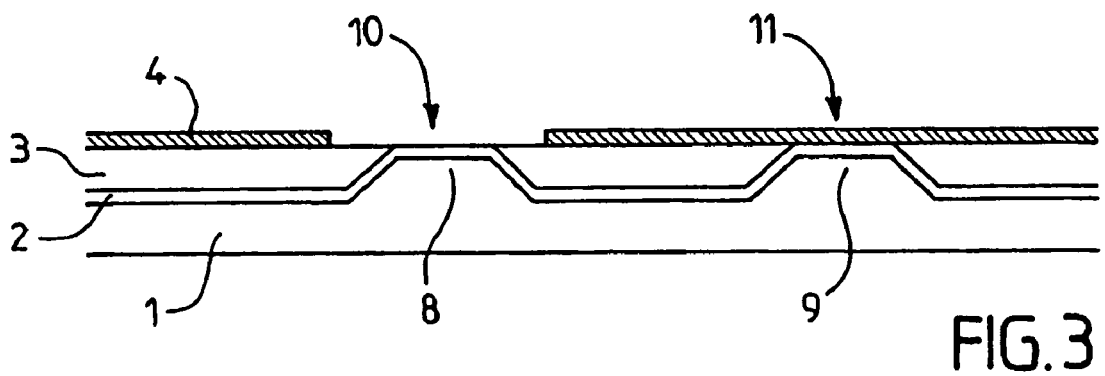

The precursor is then optionally cut into wafers and is ready to be personalized. This personalization step is represented in FIG. 3. It comprises insolating the photosensitive resin (4) with a laser (for example, a 400-nanometer laser diode) to form spots on the surface of the precursor conforming to the information to be coded on the peaks of the ribs (8, 9) and, thus, by complementarity, the spaces to be preserved to form microreliefs. The local insolation is manifested by the localized suppression of the photosensitive resin and the formation of a hole (10) allowing the appearance of the substrate coated by the separation layer (2) outside of the peak of the ribs (8, 9). The absence of an insolation spot is manifested by the maintenance of the resin (11) locally protecting the peak of the rib (9).

Figure 4:
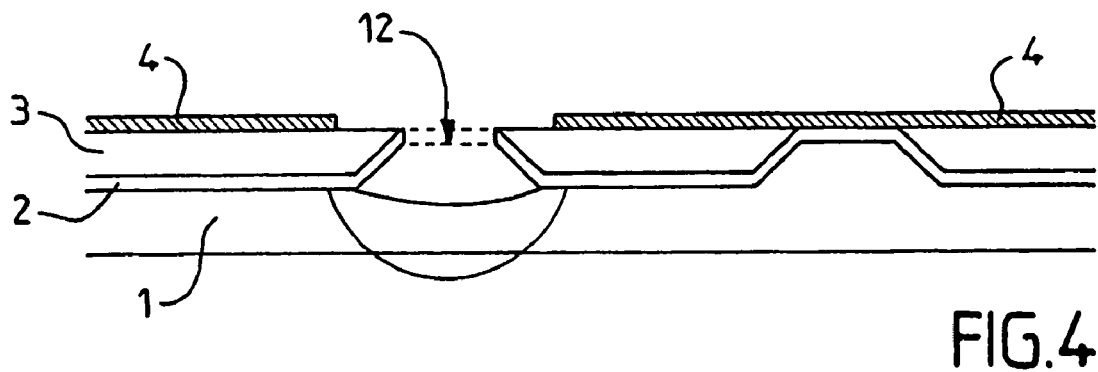
Figure 5:
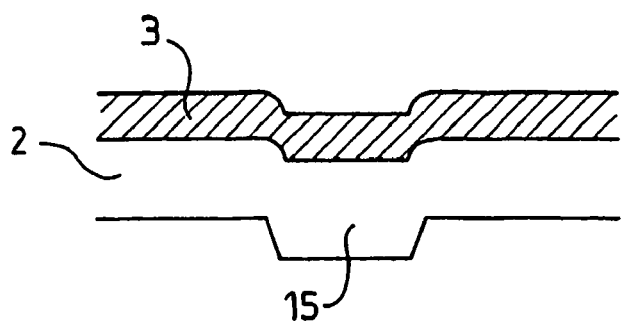
FIGS. 5 to 9 represent views in radial section of a precursor at different phases of preparation, according to aspects of the invention.
Figure 6:
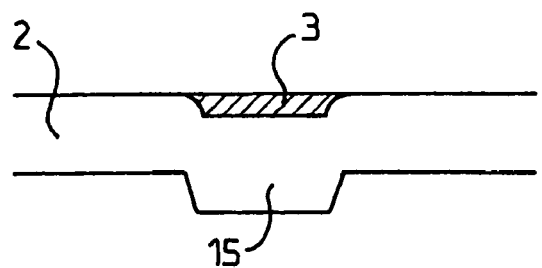

The following operation is represented in FIG. 4. It comprises etching the surface of the precursor in a known manner, with the resin forming an etching mask. This etching is implemented, for example, by chemical attack. This etching is manifested by the formation of a microhole (12) at the sites where the resin was insolated, these microholes (12) being located on the guiding rib formed during the step of preparation of the precursor.

The process is then terminated by removing the subsisting resin and dielectric, this operation being facilitated by the presence of the separation layer (2). At the sites of the rib covered by a resin that did not receive insolation during the preceding steps there, thus, subsists a portion of the peak, identical to the microreliefs of an optical disk molding master prepared by the usual methods.

FIGS. 5 to 9 pertain to another example of implementation of the invention in which the guiding track is formed by a guiding groove (15) and not by a guiding rib (8, 9).

The first step comprises depositing on the substrate (1) a coating, for example, of silicon (2) following the form of the relief, and notably the guiding groove (15) and constituting a separation layer. A second coating, for example, of silica (3) is deposited on the first coating. The next step (FIG. 6) comprises performing a mechanical-chemical polishing to level the silicon separation layer (2) with the level of the grooves (15). In contrast, the layer of the second silica coating disappears from separation layer (2) except in the concave grooves (15).

Figure 7:
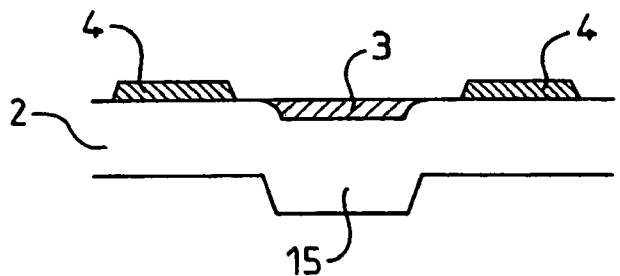

A photosensitive resin (4) is then deposited on selected portions of the surface of the unit prepared in this manner (FIG. 7). The precursor is then ready to be personalized. This step comprises insolating the photosensitive resin with a laser (for example, a 400-nanometer laser diode) to form spots on the surface of the precursor conforming to the information to be coded above the bottoms of the grooves (15) and, thus, by complementarity, the spaces to be preserved to form the microreliefs. The local insolation is manifested by the localized suppression of the photosensitive resin (4) and the formation of a hole allowing appearance of the substrate coated by the second coating (3), and the separation layer (2) outside of the peak of the spiral. The absence of insolation spot is manifested by the maintenance of the resin (4) locally preventing the coating of the rib.

The next operation (FIG. 8) comprises of etching the surface of the precursor in a known manner, the resin forming an etching mask. This etching is implemented, for example, by reactive ionic machining, or RIE, using the gas $CHF_3$. This etching is manifested by formation of a microhole (12) at the sites where the resin was insolated, these microholes being located on the guiding spiral formed during the step of preparation of the precursor, in which the second coating is etched. The resin is then removed from the substrate unit using a solvent or in an oxygen-based reactive plasma. The separation material is then etched, for example, also using a reactive ionic machining process using $SF_6$, with the second coating portions not etched during the preceding step being used as masks. There thus subsist protuberant parts of a sandwich constituted by silicon separation material and second silica coating.

Figure 8:
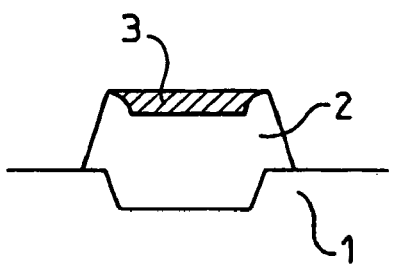

FIG. 8 represents the result after etching of the separation layer (2) at the level of a zone protected by the resin. It has a nickel surface forming the substrate (11) on which there are presented pits formed by a layer of separation material (2) and a layer of the second material (3).

Figure 9:

FIG. 9 represents a sectional view of a zone in which the resin was degraded by photoinsolation.

Figure 10:
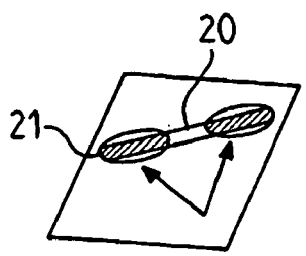
FIGS. 10–11 represent perspective views of the precursor of FIGS. 5–9.
Figure 11:
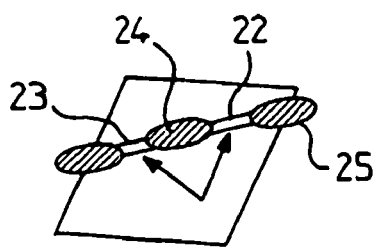

FIGS. 10 and 11 represent top views of two segments. The exposed zones (20, 21) form, after treatment, residual grooves (22, 23) separating the pits (24, 25).

The method described in both modes of implementation produces pits of information the width of which, on the one hand, and the length of which, on the other hand, originate from two different procedures at two different steps of fabrication. This is not the case in the classic method in which everything is determined by a photolithography procedure. The most important consequence is that it makes it possible to envisage the implementation of a single writing head for writing both CD and DVD formats.

In a similar manner and for the same reasons, the slopes of the pits can be different in the radial direction (intertrack) and the tangential direction (between two pits). Since the slope of the tracks in the tangential direction has an influence on the quality of the signal (the more vertical, the clearer the transition and the better the signal), whereas the slopes in general have an influence on the quality of the disk/master unmolding and, thus, on the fabrication cycle time (the less vertical, the better the unmolding), this possibility can create interesting prospects: master having radially "soft" slopes but very stiff slopes in the tangential direction.

One of the difficulties of the method is that the metal etching should be uniform since nothing intervenes to automatically stop it. For that, it is possible to implement a first deposition on the precursor of a carefully selected metallic layer (a nickel alloy, for example) which is etched at a different rate from the subjacent metallic substrate, enabling introduction of a stopping layer on at least part of the pit surface. This has the advantage of creating a pit which would automatically be better defined in depth.

According to a fabrication mode by electroplating, the step of fabrication of the precursors comprises a step of deposition of a separation layer and at least one layer of a conductor material in the preparation master, then deposition of the substrate material on said conductor material, then separation of the deposits with the master. The separation material is made, for example, of chromium.

During the step of exposure of the precursor to the etching light source, it is necessary to attach the substrate to a rotary support with precise cushioning providing substantially perfect levelness and an ensured centering. An advantageous solution comprises of using a magnetic rotary support providing a magnetic interaction with the substrate made of nickel or a magnetic material. For this purpose, the invention also pertains to etching equipment comprising a magnetic rotary support providing for the maintenance of a precursor during the etching step.

The separation between the magnetic support and the precursor is implemented by means of a series of retractable pins which become erect in relation to the precursor support surface after the etching operation.

The invention claimed is:

1. A method of fabricating an optical disk master comprising:
    fabricating a precursor formed from a substrate comprising at least one layer of metallic material and having at least one protuberance guiding track or indentation guiding track;
    preparing the precursor by superposing on the substrate at least one layer of a first material and a second material different from the first material;
    eroding at least a portion of a surface of one of the materials to only allow to subsist one of said materials at a site of the guiding tracks;
    depositing on the surface a reactive resin;
    personalizing the precursor by structuring the reactive surface as a function of information specific to the master to locally eliminate the reactive resin;
    establishing etching zones of the second material at a site of unmasked guiding tracks; and
    eliminating subsisting deposits of resin and the first material outside of the zones covered by the second material.

2. The method according to claim 1, wherein the second material is metallic, identical or different from the substrate, and present on the substrate prior to deposition of the first material, and the first material is formed of at least one layer of material of optical properties essentially different from the metallic material at a wavelength that can be used in equipment for structuring reactive resins.

3. The method according to claim 1, wherein the guiding tracks are formed from at least one protuberance.

4. The method according to claim 1, wherein first material comprises at least one layer of material of optical properties essentially different from the second material at a wavelength that can be used in equipment for structuring reactive resin, and the second material, deposited subsequent to the first material, comprises at least one layer for preventing local etching of the first material under the second material during personalization of the precursor.

5. The method according to claim 1, wherein the guiding tracks are grooves.

6. The method according to claim 1, wherein the metallic material constituting the substrate is selected from the group consisting of nickel, nickel-based alloys, chromium, chromium-based alloys, titanium nitrides, tantalum, molybdenum and alloys thereof.

7. The method according to claim 1, wherein the reactive resin is a photoreactive resin resistant to etching products for metallic materials.

8. The method according to claim 1, wherein the reactive resin is a photosensitive resin.

9. The method according to claim 1, wherein preparing the precursor comprises planarization prior to deposition of the reactive resin.

10. The method according to claim 9, wherein said planarization is performed by mechanical-chemical polishing.

11. The method according to claim 9, wherein the planarization is performed by dry film polishing.

12. The method according to claim 9, wherein the planarization is performed by depositing on the precursor, covered by a dielectric material with a thickness of about 200 to about 500 nm, a layer of polymer resin having a plane surface, etching the surface by dry etching and removing the resin and dielectric material at a substantially identical rate until the resin disappears.

13. The method according to claim 9, wherein planarization is implemented by depositing a planarizing polymer layer, undergoing a first gentle annealing, followed by controlled etching of the polymer layer to expose at least a portion of the second material and energetic annealing at a temperature higher than about 110° C.

14. The method according to claim 1, wherein fabrication of precursors comprising guiding tracks comprises electroplating.

15. The method according to claim 1, wherein fabrication of precursors comprising guiding tracks comprises substrate molding.

16. The method according to claim 1, wherein the first material is insensitive to guiding element etching, of radial width after emergence of individual information elements released from a guiding element being determined by an initial radial width of guiding elements and the length in the tangential direction of individual information elements is determined by structuring of the reactive resin.

17. The method according to claim 1, wherein preparing the precursor comprises depositing on the metallic substrate a first separation layer having a thickness smaller than the guiding tracks and an exterior layer made of a dielectric material, and planarization by abrasion prior to deposition of the reactive resin to allow subsistence of a thickness of coating comprised between the height of the guiding tracks and the height augmented by the thickness of the separation layer.

18. The method according to claim 1, wherein a slope and an apex of information elements in a radial direction of the disk generated during first substrate formation comprised between about 20 and about 60° in relation to a reference plane of the substrate, is unchanged during deposition and removal procedures leading to an individualized master, whereas the slope of the information elements in a tangential direction, comprised between about 40 and about 90° in relation to the reference plane of the substrate, is generated by metallic etching masked by a structured resin.

19. The method according to claim 1, wherein the precursor comprises superposition of the metallic substrate, of the second material, prior to deposition of the first material, the second material having the property of being able to be etched in a selective manner in relation to the substrate.

20. The method according to claim 1, wherein preparation of the precursor comprises deposition of the first material, deposition of a separation layer having a thickness smaller than the guiding tracks, deposition of an exterior layer made of a dielectric material, and planarization by abrasion prior to deposition of a reactive resin to allow subsistence of a coating thickness comprised between the height of the guiding tracks and the height augmented by the thickness of the separation layer.

21. The method according to claim 1, wherein the first material is etched during master personalization using the second material as a mask, wherein the substrate comprises guiding grooves, the sides of which have a slope comprised between about 20 and about 60° in relation to a principal plane of the substrate, the second material consequently having a variable thickness in a radial direction of the disk, and the second material is slowly etched during the etching of the first material, leading to a slope of the first material in the radial direction comprised between about 20 and about 60° in relation to the principal plane, and a slope comprised between about 40 and about 90° in relation to the substrate in a direction tangential to the guiding tracks.

22. The method according to claim 1, wherein the reactive resin is a resin structured by localized sublimation under radiation.

23. The method according to claim 1, wherein the precursor fabrication comprises, optionally, deposition of a separation layer, at least deposition of a layer of conductor material in the preparation master, deposition of the substrate material on the deposition of conductor material, and separation of the deposits with the master.

* * * * *

UNITED STATES PATENT AND TRADEMARK OFFICE
CERTIFICATE OF CORRECTION

| | |
|---|---|
| PATENT NO. | : 7,118,681 B2 |
| APPLICATION NO. | : 10/746354 |
| DATED | : October 10, 2006 |
| INVENTOR(S) | : Pirot |

It is certified that error appears in the above-identified patent and that said Letters Patent is hereby corrected as shown below:

On the Title Page: Item (30)

Please add the following foreign application priority data:

--France 01/08423 filed 06/26/2001--.

Signed and Sealed this

Seventeenth Day of April, 2007

JON W. DUDAS
*Director of the United States Patent and Trademark Office*